(12) United States Patent
Qiu

(10) Patent No.: US 10,802,194 B2
(45) Date of Patent: Oct. 13, 2020

(54) DIRECT TYPE REFLECTIVE SHEET STRUCTURE AND BACKLIGHT MODULE

(71) Applicant: HUIZHOU CHINA STAR OPTOELECTRONICS TECHNOLOGY CO., LTD., Huizhou, Guangdong (CN)

(72) Inventor: Yongyuan Qiu, Huizhou Guangdong (CN)

(73) Assignee: HUIZHOU CHINA STAR OPTOELECTRONICS TECHNOLOGY CO., LTD., Huizhou, Guangdong (CN)

( * ) Notice: Subject to any disclaimer, the term of this patent is extended or adjusted under 35 U.S.C. 154(b) by 323 days.

(21) Appl. No.: 16/023,593

(22) Filed: Jun. 29, 2018

(65) Prior Publication Data

US 2019/0227216 A1    Jul. 25, 2019

Related U.S. Application Data

(63) Continuation of application No. PCT/CN2018/078801, filed on Mar. 13, 2018.

(30) Foreign Application Priority Data

Jan. 24, 2018 (CN) .......................... 2018 1 0066613

(51) Int. Cl.
*F21V 7/04* (2006.01)
*F21V 8/00* (2006.01)
*G02F 1/13357* (2006.01)

(52) U.S. Cl.
CPC .......... *G02B 6/0031* (2013.01); *G02B 6/003* (2013.01); *G02B 6/0025* (2013.01); *G02F 1/133603* (2013.01)

(58) Field of Classification Search
CPC .... G02B 6/0031; G02B 6/003; G02B 6/0035; G02F 1/133603; G02F 1/133602; G02F 1/133605; G02F 1/133611; G02F 1/1336
USPC ......................................................... 362/609
See application file for complete search history.

(56) References Cited

U.S. PATENT DOCUMENTS 2,814,861 A * 12/1957 O'Connell ............... H02G 7/06
29/423

FOREIGN PATENT DOCUMENTS

| CN | 101839419 A | 9/2010 |
| CN | 102287722 | 12/2011 |
| CN | 106773286 | 5/2017 |
| WO | WO2012141094 A1 | 10/2012 |

* cited by examiner

*Primary Examiner* — Ali Alavi
(74) *Attorney, Agent, or Firm* — Leong C. Lei

(57) ABSTRACT

Disclosed is a direct type reflective sheet structure, comprising a reflective sheet, on which a plurality of light emitting diode light sources are arranged in an array. A plurality of triangular prism-shaped microstructures is arranged at intervals on the reflective sheet around each of the light emitting diode light sources. Each of the microstructures has a reflective surface facing the light emitting diode light source to reflect light emitted by the light emitting diode light source. Further disclosed is a direct type backlight module. By implementing the embodiment of the present invention, it can avoid the appearance of color deviation on the display panel and reduce the loss of light.

11 Claims, 2 Drawing Sheets

DIRECT TYPE REFLECTIVE SHEET STRUCTURE AND BACKLIGHT MODULE

CROSS REFERENCE

This application is a continuing application of PCT/CN2018/078801 filed Mar. 13, 2018, which claims the priority of Chinese Patent Application No. 201810066613.3, entitled "Direct type reflective sheet structure and backlight module", filed on Jan. 24, 2018, the disclosure of which is incorporated herein by reference in its entirety.

FIELD OF THE INVENTION

The present invention relates to a display field, and more particularly to a direct type reflective sheet structure and a backlight module.

BACKGROUND OF THE INVENTION

In the prior art, it is commonly used in the liquid crystal display backlight module to add a phosphor film to achieve high saturation display, which is a common means in the market.

As shown in FIG. 1, illustrating a structural diagram of a direct type backlight module in the prior art. It shows that the LED light source 1' arranged on the backplate 2' emits light to the optical module 3' to provide the backlight for the liquid crystal display panel 4'. However, in such conventional structure, after adding the phosphor film to the optical module 3', it is often found that the optical quality of the backlight deteriorates. The most obvious is that the area directly positioned above the LED light source 1' often appears bluish. The problem of the color deviation due to the use of the phosphor film in such direct type backlight structure may occur in all the direct type phosphor films.

To solve this problem, the designers in the industry usually use yellow ink or yellow phosphor coating under the LED, on the PCB and on the lateral reflective sheets to complement the color deviation in the area. However, this method imposes stringent requirements on the ink type or the ratio of the phosphors. Any minor differences may cause the color deviation still to remain.

Some other designers in the industry have found that the main reason for the color deviation of the direct type phosphor film solution is that the collimation of light affects the excitation of the phosphor film through the light path analysis and the experimental tests. Meanwhile, it was confirmed that a cross prism structure can be added under the phosphor film, so that when the light was excited by the phosphor film, the light angle has been corrected to a small angle direction and the problem of color deviation can be effectively solved. However, such method also has serious drawbacks. As two prism sheets are added under the phosphor film, ie, the film structure is an orthogonal prism, a phosphor film, an orthogonal prism and a reflective polarizer (DBEF), the brightness is reduced by 40% in comparison with that as the two prism sheets are not added. In case of the film structure with an orthogonal prism, a phosphor film and a reflective polarizer, the target chromaticity of the optical module is difficult to achieve due to insufficient times of the optical path reciprocation at the place where the phosphor film is placed.

SUMMARY OF THE INVENTION

An objective of the present invention is to provide a direct type reflective sheet structure and a backlight module, which can avoid the appearance of color deviation on the display panel and reduce the loss of light.

For solving the aforesaid technical issues, first, the embodiment of the present invention provides a direct type reflective sheet structure, comprising a reflective sheet, on which a plurality of light emitting diode light sources are arranged in an array, wherein a plurality of triangular prism-shaped microstructures are arranged at intervals on the reflective sheet around each of the light emitting diode light sources, each of the microstructures has a reflective surface facing the light emitting diode light source to reflect light emitted by the light emitting diode light source.

The plurality of microstructures around each of the light emitting diode light sources have a same height, the reflective surface facing the light emitting diode light source in each of the microstructures has an included angle with a horizontal plane, and the included angle is an acute angle.

Heights of the plurality of microstructures around each of the light emitting diode light sources increase as being farther from the light emitting diode light source, and a height of the microstructure in a middle of two adjacent light emitting diode light sources is the highest.

For the plurality of microstructures around each of the light emitting diode light sources, the included angles of the reflective surfaces facing the light emitting diode light source with the horizontal plane are larger as being farther from the light emitting diode light source, and an included angle of the reflective surface of the microstructure in a middle of two adjacent light emitting diode light sources is the largest.

The microstructures are formed by thermoplastic molding.

Correspondingly, the embodiment of the present invention further provides a direct type backlight module, comprising a reflective sheet, a backplate matched with the reflective sheet, light emitting diode light sources and an optical module, wherein:

the backplate is disposed on one side of the reflective sheet and is fixed with the reflective sheet; the optical module is disposed on the other side of the reflective sheet to uniformly emit light reflected by the reflective sheet;

a plurality of light emitting diode light sources are arranged in an array on the reflective sheet, a secondary lens is disposed on a light exiting surface of each of the light emitting diode light sources; a plurality of triangular prism-shaped microstructures are arranged at intervals on the reflective sheet around each of the light emitting diode light sources, each of the microstructures has a reflective surface facing the light emitting diode light source to receive and reflect light emitted by the light emitting diode light source.

The plurality of microstructures around each of the light emitting diode light sources have a same height, the reflective surface facing the light emitting diode light source in each of the microstructures has an included angle with a horizontal plane, and the included angle is an acute angle.

Heights of the plurality of microstructures around each of the light emitting diode light sources increase as being farther from the light emitting diode light source, and a height of the microstructure in a middle of two adjacent light emitting diode light sources is the highest.

For the plurality of microstructures around each of the light emitting diode light sources, the included angles of the reflective surfaces facing the light emitting diode light source with the horizontal plane are larger as being farther from the light emitting diode light source, and an included angle of the reflective surface of the microstructure in a middle of two adjacent light emitting diode light sources is the largest.

A height of each of the microstructures is greater than or equal to a height of the secondary lens.

With implementing the embodiments of the present invention, the benefits are: in the embodiment of the present invention, by a plurality of triangular prism-shaped microstructures at intervals on the reflective sheet around each of the light emitting diode light sources, each of the microstructures has a reflective surface facing the light emitting diode light sources. The reflective surface can reflect light emitted by the light emitting diode light source through the secondary lens. By controlling the included angle between the reflective surface and the horizontal plane, the light reflected by the reflective sheet can be concentratedly and uniformly reflected to the optical module, so that the problem of color deviation in the prior art can be avoided.

Moreover, the embodiments of the present invention can avoid the loss of light.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention; those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are merely part of embodiments of the present invention, but not all embodiments. Based on the embodiments of the present invention; all other embodiments to those of ordinary skill in the premise of no creative efforts obtained, should be considered within the scope of protection of the present invention.

Figure 1:
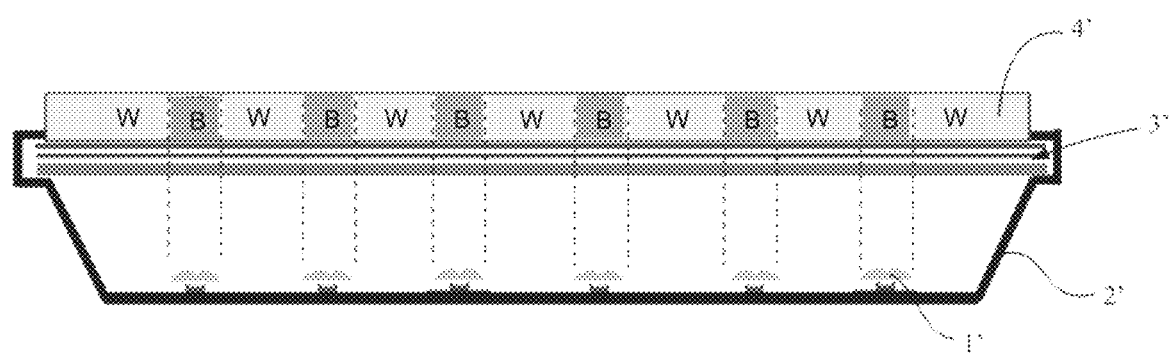
FIG. 1 is a structural diagram of a direct type backlight module in the prior art.
Figure 2:
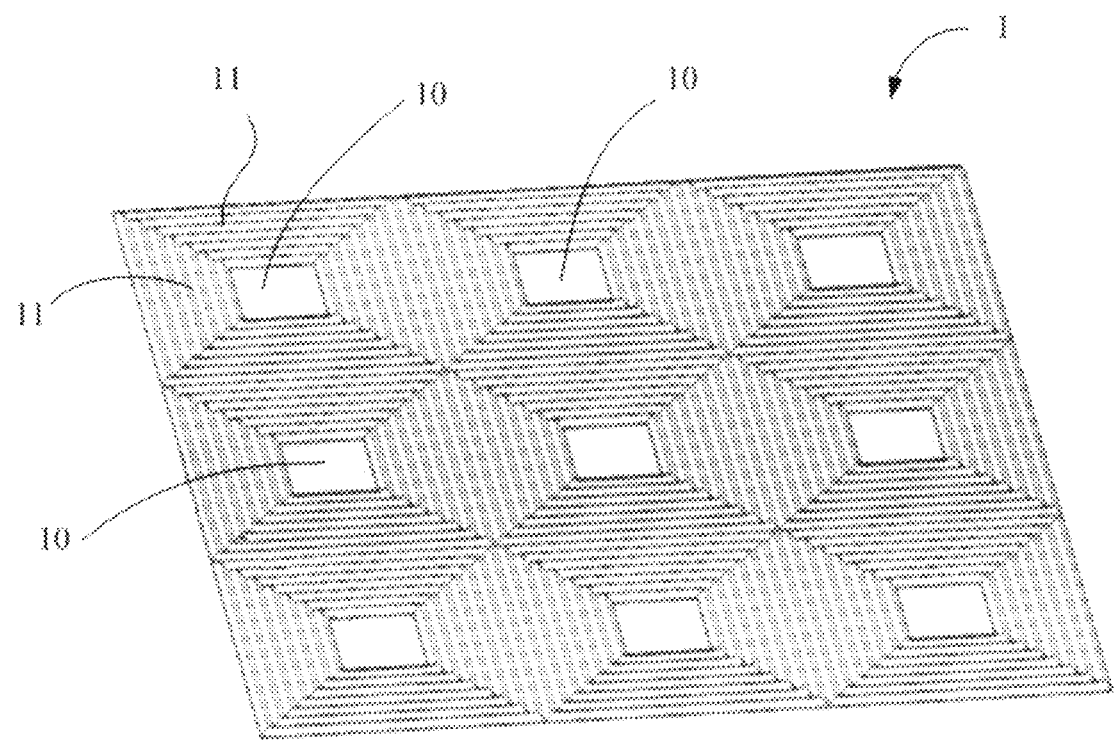
FIG. 2 is a structural diagram of one embodiment according to a direct type reflective sheet structure provided by the present invention.
Figure 3:
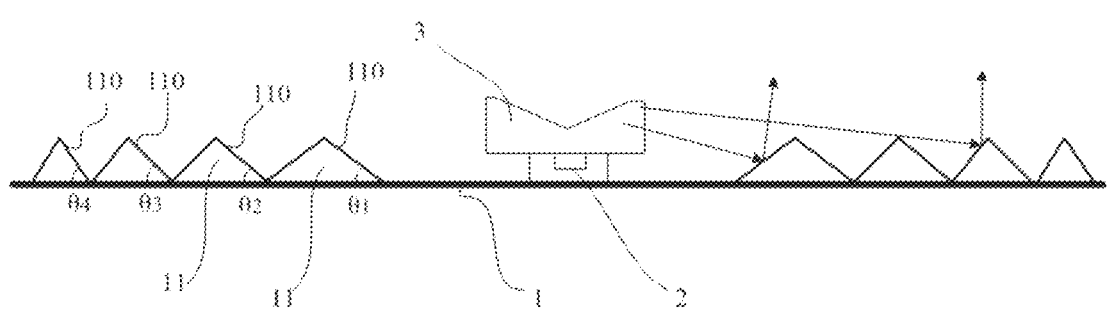
FIG. 3 is a structural diagram of one embodiment according to microstructures in FIG. 2.
Figure 4:
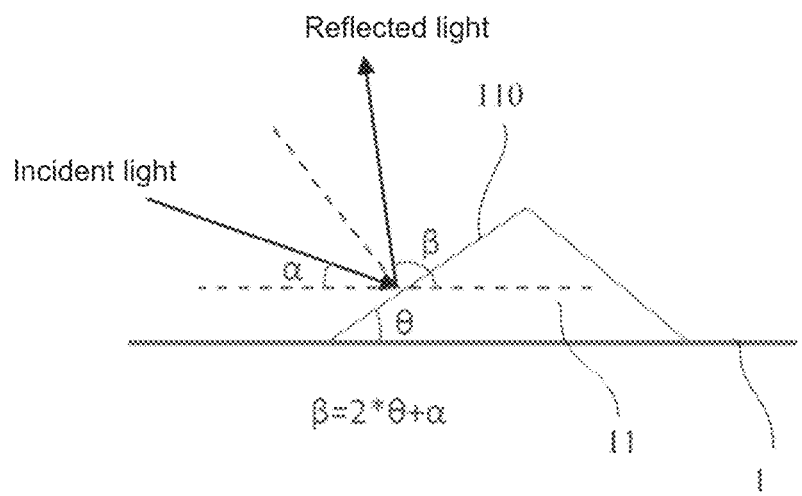
FIG. 4 is a diagram of an optical transmission principle in FIG. 3.

Please refer to FIG. 2, which illustrates a structural diagram of one embodiment according to a direct type reflective sheet structure provided by the present invention with FIG. 3 and FIG. 4, together. In this embodiment, the direct type reflective sheet structure comprises a reflective sheet 1. A plurality of light emitting diode attaching areas 10 are arranged in an array on the reflective sheet 1. Each of the light emitting diode attaching areas 10 is configured with a light emitting diode light source 2. A secondary lens 3 is arranged on the light emitting diode light source 2.

A plurality of triangular prism-shaped microstructures 11 are arranged at intervals on the reflective sheet 1 around each of the light emitting diode light sources 2. Each of the microstructures 11 has a reflective surface 110 facing the light emitting diode light source 2 to reflect light emitted by the light emitting diode light source 2. Specifically, the microstructures 11 are formed by thermoplastic molding.

In this embodiment, the plurality of microstructures 11 around each of the light emitting diode light sources 2 has a same height. The reflective surface 110 facing the light emitting diode light source 2 in each of the microstructures 11 has an included angle θ with a horizontal plane. Specifically, the included angle θ is an acute angle. More specifically, for the plurality of microstructures 11 around each of the light emitting diode light sources 2, the included angles of the reflective surfaces 110 facing the light emitting diode light source 2 with the horizontal plane are larger as being farther from the light emitting diode light source 2, and an included angle of the reflective surface of the microstructure in a middle of two adjacent light emitting diode light sources is the largest. In FIG. 3, θ1<θ2<θ3<θ4.

As can be understood in the embodiment of the present invention, the secondary lens 3 is a catadioptric lens. Most of the light emitted by the light emitting diode light source 2 is deflected in the secondary lens 3 and then emitted to the periphery; the light from the secondary lens 3 is reflected by the reflective sheet 1 to the optical module 5. With the secondary modulation of the microstructures 11, a longer transmission distance can be achieved as the optical distance (OD) is the same, i.e., a larger light emitting diode pitch (LED pitch) can be achieved.

FIG. 4 shows the optical transmission principle. It shows that the included angle between the incident light and the horizontal line is α. The included angle between the exiting light and the horizontal line is β. The included angle between the reflective surface 110 of the microstructure 11 and the horizontal line is θ. Then, we can get: β=2*θ+α. In practical applications, in order to realize that the light ultimately exits at a relatively small angle from the center, the tilt angle θ on the microstructure 11 needs to be adjusted according to the incident light angle α to obtain a β angle that meets the requirement. However, in some embodiments, as the angle range of β is: 50 degrees<β<130 degrees, the color deviation issue can be solved well.

In practical applications, most of the exiting light of the secondary lens 3 will exit approaching the level (0 degree), as shown in FIG. 4, the incidence angle α is closer to 0 degree. Thus, in some embodiments, the range of the included angle θ between the reflective surface 110 of the microstructure 11 and the horizontal plane may generally be: 25 degrees<θ<75 degrees.

Figure 5:
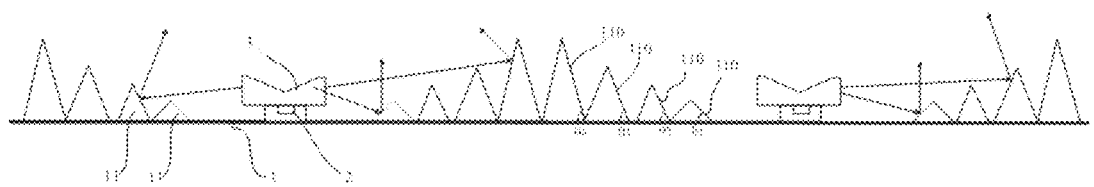
FIG. 5 is a structural diagram of another embodiment according to microstructures in FIG. 2.
Figure 6:
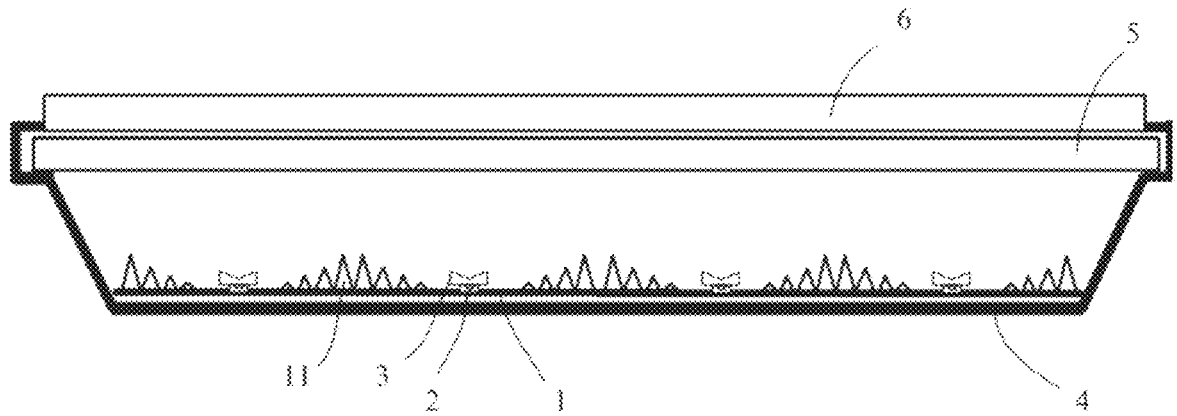
FIG. 6 is a structural diagram of a direct type backlight module provided by the present invention.

As shown in FIG. 5, illustrating a structural diagram of another embodiment according to microstructures in FIG. 2, in the second embodiment, the difference from the first embodiment shown in FIG. 3 is that the plurality of microstructures 11 around each of the light emitting diode light sources 2 has different heights. The heights increase as being farther from the light emitting diode light source 2, and a height of the microstructure in a middle of two adjacent light emitting diode light sources 2 is the highest. Meanwhile, for the plurality of microstructures 11 around each of the light emitting diode light sources 2, the included angles of the reflective surfaces 110 facing the light emitting diode light source 2 with the horizontal plane are larger as being farther from the light emitting diode light source 2, and an included angle of the reflective surface of the microstructure in a middle of two adjacent light emitting diode light sources is the largest. In FIG. 5, θ1<θ2<θ3<θ4.

Correspondingly, the embodiment of the present invention further provides a direct type backlight module, comprising a reflective sheet 1, a backplate 4 matched with the reflective sheet 1, light emitting diode light sources 2 and an optical module 5, wherein:

the backplate 4 is disposed on one side of the reflective sheet 1 and is fixed with the reflective sheet 1, such as the two can be fixed by viscose; the optical module 5 is disposed on the other side of the reflective sheet 1 to uniformly emit light reflected by the reflective sheet 1, and a liquid crystal display panel 6 is disposed on the other side of the optical module 5;

a plurality of light emitting diode light sources 2 are arranged in an array on the reflective sheet 1, a secondary lens 3 is disposed on a light exiting surface of each of the light emitting diode light sources 2; a plurality of triangular prism-shaped microstructures 11 are arranged at intervals on the reflective sheet 1 around each of the light emitting diode light sources 2, each of the microstructures 11 has a reflective surface 110 facing the light emitting diode light source 2 to receive light from the secondary lens 3 and reflect the light to the optical module 5.

The plurality of microstructures 11 around each of the light emitting diode light sources 2 has a same height. The reflective surface 110 facing the light emitting diode light source 2 in each of the microstructures 11 has an included angle with a horizontal plane. The included angle is an acute angle. Meanwhile, for the plurality of microstructures 11 around each of the light emitting diode light sources 2, the included angles of the reflective surfaces 110 facing the light emitting diode light source 2 with the horizontal plane are larger as being farther from the light emitting diode light source 2, and an included angle of the reflective surface of the microstructure in a middle of two adjacent light emitting diode light sources is the largest, and the range of the included angle is: 25 degrees<θ<75 degrees.

In another embodiment, the heights of the plurality of microstructures 11 around each of the light emitting diode light sources 2 increase as being farther from the light emitting diode light source 2, and a height of the microstructure in a middle of two adjacent light emitting diode light sources 2 is the highest. Meanwhile, for the plurality of microstructures 11 around each of the light emitting diode light sources 2, the included angles of the reflective surfaces 110 facing the light emitting diode light source 2 with the horizontal plane are larger as being farther from the light emitting diode light source 2, and an included angle of the reflective surface of the microstructure in a middle of two adjacent light emitting diode light sources is the largest, and the range of the included angle is: 25 degrees<θ<75 degrees.

In both cases, the height of each of the microstructures 11 is greater than or equal to a height of the secondary lens 3. This ensures that most of the light from the light emitting diode light source 2 can be reflected by the microstructures 11 of the reflective sheet 1 into the optical module 5.

In one embodiment, the optical module 5 can adopt a structure of an orthogonal prism, a phosphor film and a reflective polarizer.

With implementing the embodiments of the present invention, the benefits are:

In the embodiment of the present invention, by a plurality of triangular prism-shaped microstructures at intervals on the reflective sheet around each of the light emitting diode light sources, each of the microstructures has a reflective surface facing the light emitting diode light sources. The reflective surface can reflect light emitted by the light emitting diode light source through the secondary lens. By controlling the included angle between the reflective surface and the horizontal plane, the light reflected by the reflective sheet can be concentratedly and uniformly reflected to the optical module, so that the problem of color deviation in the prior art can be avoided.

Moreover, the embodiments of the present invention can avoid the loss of light.

Incidentally, herein, relational terms such as first and second and the like are only used to distinguish one entity or operation from another entity or operation separate, without necessarily requiring or implying these entities or operations of between the presence of any such actual relationship or order. Further, the term "comprising", "containing" or any other variation thereof are intended to cover a non-exclusive inclusion, such that a process, method, article, article, or apparatus not include only those elements but not expressly listed further comprising the other elements, or further comprising such process, method, article, or apparatus inherent elements. Without more constraints, by the wording "include a" defined does not exclude the existence of additional identical elements in the element comprising a process, method, article, or apparatus.

Above are only specific embodiments of the present application, the scope of the present application is not limited to this, and to any persons who are skilled in the art, change or replacement which is easily derived should be covered by the protected scope of the application. Thus, the protected scope of the application should go by the subject claims.

What is claimed is:

1. A direct type reflective sheet structure, comprising a reflective sheet, on which a plurality of light emitting diode light sources are arranged in an array, wherein a plurality of triangular prism-shaped microstructures are arranged at intervals on the reflective sheet around each of the light emitting diode light sources, each of the microstructures has a reflective surface facing the light emitting diode light source to reflect light emitted by the light emitting diode light source; wherein heights of the plurality of microstructures around each of the light emitting diode light sources increase as being farther from the light emitting diode light source, and a height of the microstructure in a middle of two adjacent light emitting diode light sources is the highest.

2. The direct type reflective sheet structure according to claim 1, wherein the plurality of microstructures around each of the light emitting diode light sources have a same height, the reflective surface facing the light emitting diode light source in each of the microstructures has an included angle with a horizontal plane, and the included angle is an acute angle.

3. The direct type reflective sheet structure according to claim 2, wherein for the plurality of microstructures around each of the light emitting diode light sources, the included angles of the reflective surfaces facing the light emitting diode light source with the horizontal plane are larger as being farther from the light emitting diode light source, and an included angle of the reflective surface of the microstructure in a middle of two adjacent light emitting diode light sources is the largest.

4. The direct type reflective sheet structure according to claim 1, wherein for the plurality of microstructures around each of the light emitting diode light sources, the included angles of the reflective surfaces facing the light emitting diode light source with the horizontal plane are larger as being farther from the light emitting diode light source, and an included angle of the reflective surface of the microstructure in a middle of two adjacent light emitting diode light sources is the largest.

5. The direct type reflective sheet structure according to claim 4, wherein the microstructures are formed by thermoplastic molding.

6. A direct type backlight module, comprising a reflective sheet, a backplate matched with the reflective sheet, light emitting diode light sources and an optical module, wherein:
the backplate is disposed on one side of the reflective sheet and is fixed with the reflective sheet; the optical module is disposed on the other side of the reflective sheet to uniformly emit light reflected by the reflective sheet;
a plurality of light emitting diode light sources are arranged in an array on the reflective sheet, a secondary lens is disposed on a light exiting surface of each of the light emitting diode light sources; a plurality of triangular prism-shaped microstructures are arranged at intervals on the reflective sheet around each of the light emitting diode light sources, each of the microstructures has a reflective surface facing the light emitting diode light source to receive and reflect light emitted by the light emitting diode light source;
wherein heights of the plurality of microstructures around the each of the light emitting diode light sources increase as being farther from the light emitting diode light source, and a height of the microstructure in a middle of two adjacent light emitting diode light sources is the highest.

7. The direct type backlight module according to claim 6, wherein the plurality of microstructures around each of the light emitting diode light sources have a same height, the reflective surface facing the light emitting diode light source in each of the microstructures has an included angle with a horizontal plane, and the included angle is an acute angle.

8. The direct type backlight module according to claim 7, wherein for the plurality of microstructures around each of the light emitting diode light sources, the included angles of the reflective surfaces facing the light emitting diode light source with the horizontal plane are larger as being farther from the light emitting diode light source, and an included angle of the reflective surface of the microstructure in a middle of two adjacent light emitting diode light sources is the largest.

9. The direct type backlight module according to claim 8, wherein a height of each of the microstructures is greater than or equal to a height of the secondary lens.

10. The direct type backlight module according to claim 6, wherein for the plurality of microstructures around each of the light emitting diode light sources, the included angles of the reflective surfaces facing the light emitting diode light source with the horizontal plane are larger as being farther from the light emitting diode light source, and an included angle of the reflective surface of the microstructure in a middle of two adjacent light emitting diode light sources is the largest.

11. The direct type backlight module according to claim 10, wherein a height of each of the microstructures is greater than or equal to a height of the secondary lens.

* * * * *